United States Patent
Fukuda et al.

[15] 3,671,395
[45] June 20, 1972

[54] METHOD FOR PRODUCING CITRIC ACID

[72] Inventors: Hideo Fukuda, Osaka; Takashi Suzuki, Takarazuka; Yasuhiro Sumino, Kobe; Shunichi Akiyama, Kyoto, all of Japan

[73] Assignee: Takeda Chemical Industries, Ltd., Osaka, Japan

[22] Filed: Jan. 30, 1970

[21] Appl. No.: 7,232

[30] Foreign Application Priority Data

Jan. 30, 1969 Japan........................................44/6956

[52] U.S. Cl. ............................................................195/28 R
[51] Int. Cl. ........................................................C12d 13/00
[58] Field of Search ..........................195/28, 42, 47, 3 H, 37

[56] References Cited

OTHER PUBLICATIONS

Kyowa Fermentation Ind. (I); Chemical Abs., # 86,141K, page 8288, May 10, 1968

Tanaka, K.; Chem Abs., vol. 69, # 95103X, 1968
Kyowa Fermentation Ind. (II); Chem Abs., vol. 67, # 72,464K, 1967
Ladd, Aust. J of Biol. Sci., vol. 9, p. 92– 104, 1956

*Primary Examiner*—A. Louis Monacell
*Assistant Examiner*—Gary M. Nath
*Attorney*—Wenderoth, Lind & Ponack

[57] ABSTRACT

Method for producing citric acid which involves inoculating a citric acid-accumulating and hydrocarbon-assimilating strain of bacterium belonging to the genus Corynebacterium in an aqueous culture medium containing at least one $C_9$–$C_{20}$– normal paraffin as the principal carbon source; incubating the culture at a pH of from about 5 to about 8 until citric acid is substantially accumulated in the culture broth; and recovering the the so-accumulated citric acid therefrom. The advantage of the above method resides in the fact that the n-paraffin hydrocarbon source is available in large quantities and at low cost; the fermentation period (2–3 days) is considerably shorter than conventional methods and the citric acid thus-obtained is produced in a high yield and in a pure form.

11 Claims, No Drawings

METHOD FOR PRODUCING CITRIC ACID

This invention relates to a method for producing citric acid.

More particularly, this invention relates to a method for producing citric acid which comprises inoculating a citric acid-accumulating and hydrocarbon-assimilating bacterium of the genus *Corynebacterium* in an aqueous culture medium containing, as the main carbon source, at least one normal paraffin containing nine to 20 carbon atoms in the molecule, incubating the culture at a pH of from about 5 to about 8 until citric acid is substantially accumulated in the culture broth; and recovering so-accumulated citric acid therefrom.

Citric acid is in a great demand and used, for example, as an acidulant in beverage and in pharmaceutical syrups.

Regarding the production of citric acid by fermentation, processes involving the use of microorganisms such as the molds belonging to the genera *Penicillium*, *Aspergillus*, etc. are well known and have been the subjects of numerous reports and patents. These processes, however, invariably depend upon the employment of sugars and other expensive carbon sources, and the fermentation period is as long as 5 to 12 days. Recently, processes employing yeasts and bacteria have been disclosed, but the yields of citric acid relative to the carbon sources used has never been as satisfactory as might have been expected.

The present inventors have conducted an extensive study of fermentation with hydrocarbons as carbon sources and ultimately discovered that a group of bacteria, particularly those belonging to the genus Corynebacterium, produce citric acid from n-paraffins under aerobic conditions in unusually high yields. The present invention is the culmination of the above findings.

From industrial and economic points of view, the method of this invention is by far superior to the conventional methods in that (1) hydrocarbons of n-paraffin series to be used as carbon sources are available in quantities and at low costs, (2) the fermentation period required is as short as 2 to 3 days, or less than a half of the time required in the prior art, (3) the smaller amounts of impurities in the culture assist in the purification step, and (4) citric acid is accumulated in yields not less than the equivalent by weight of n-paraffin used as the carbon source.

The main object of the present invention is to provide a method for producing citric acid in a good yield.

The other object of the present invention is to shorten the fermentation period.

The further object of the present invention is to facilitate the purification procedure and thus to provide an industrially feasible method for producing citric acid.

These objects are realized by inoculating a citric acid-accumulating and hydrocarbon-assimilating bacterium of the genus Corynebacterium in an aqueous culture medium containing, as the main carbon source, at least one normal paraffin containing nine to 20 carbon atoms in the molecule; incubating the culture at a pH of from about 5 to about 8 until citric acid is substantially accumulated in the culture broth; and recovering so-accumulated citric acid therefrom.

The aforesaid bacterium of the genus Corynebacterium, which is to be employed according to this invention, may be any strain so long as it is capable of utilizing the hydrocarbon mentioned above and converting the same to citric acid. The following are a few typical examples which can be employed to advantage in the present invention.

Corynebacterium sp. No. 1304 (ATCC 21461)
Corynebacterium sp. No. 177 (ATCC 21458)
Corynebacterium sp. No. 416 (ATCC 21459)
Corynebacterium sp. No. 803 (ATCC 21460)
Corynebacterium sp. No. 981 (ATCC 21462)
Corynebacterium sp. No. 218 (ATCC 21463)
Corynebacterium sp. No. 117 (ATCC 21464)
Corynebacterium sp. No. 279 (ATCC 21465)
Corynebacterium sp. No. 384 (ATCC 21466)
Corynebacterium sp. No. 628 (ATCC 21467)

The foregoing strains of bacterium have been deposited in the American Type Culture Collection in Rockville, Md., U.S.A., as may be witnessed by the listed ATCC members. The ATCC members of the bacterium contemplated in the present invention also appear in the various Examples, etc., throughout the disclosure.

The microbiological characteristics of those typical bacteria are shown in Table 1 and Table 2.

TABLE 1 (1)

| | Corynebacterium, sp. No. 177 ATCC 21458 | Corynebacterium, sp. No. 416 ATCC 21459 | Corynebacterium, sp. No. 981 ATCC 21462 | Corynebacterium, sp. No. 218 ATCC 21463 |
|---|---|---|---|---|
| Shape and size | Rod-shaped, varying in size; comparatively long cells are club-shaped. 0.7–0.9×1.2–1.8μ. | Rod-shaped, varying in size; comparatively long cells are club-shaped. 0.8–0.9×1.3–1.8μ. | Rod-shaped, varying in size; comparatively long cells are club-shaped. | Rod-shaped, varying in size; comparatively long cells are club-shaped, some curved. |
| Motility | Non-motile. | Non-motile. | Non-motile. | Non-motile. |
| Sporulation | Asporogenous. | Asporogenous. | Asporogenous. | Asporogenous. |
| Gram's stain | Positive. | Positive. | Positive. | Positive. |
| Cultural characteristics—bouillon agar plate. | Medium growth; irregular margin and central convexity; opaque, dull; gray with a yellowish cast. | Medium growth; irregular margin; flat, opaque, dull; gray with a yellowish cast. | Good growth; irregular margin and convex; dry, opaque, dull; gray with a yellowish cast. | Good growth; irregular margin and convex; dry, opaque, dull; gray with a yellowish cast. |
| Bouillon agar slant | Medium growth; beaded or echinulate; opaque, dull; gray with a yellowish cast, dry. | Medium growth; beaded or echinulate; opaque, dull; gray with a yellowish cast, dry. | Good growth; beaded or echinulate; gray with a yellowish cast. | Good growth; beaded or echinulate; gray with a yellowish cast. |
| Bouillon liquid culture. | Thick pellicle formed, transparent, with slight sediment. | Thick pellicle formed, transparent, with sediment. | Thick pellicle formed, transparent, with sediment. | Thick pellicle formed, transparent, with sediment. |
| Optimum temperature. | 37° C | 32° C | 28–37° C | 28–37° C. |
| Optimum pH | 6–8 | 5–8 | 6–8 | 6–8 |

TABLE 1 (2)

| | Corynebacterium, sp. No. 117 ATCC 21464 | Corynebacterium, sp. No. 279 ATCC 21465 | Corynebacterium, sp. No. 384 ATCC 21466 | Corynebacterium, sp. No. 628 ATCC 21467 |
|---|---|---|---|---|
| Shape and size | Rod-shaped, varying in size; comparatively long cells are club-shaped. | Rod-shaped, varying in size; comparatively long cells are club-shaped, some curved. | Rod-shaped, varying in size; comparatively long cells are 0.8–0.9μ×1.8–2.3μ in size. | Rod-shaped, varying in size; comparatively long cells are club-shaped. |
| Motility | Non-motile. | Non-motile. | Non-motile. | Non-motile. |
| Sporulation | Asporogenous. | Asporogenous. | Asporogenous. | Asporogenous. |
| Gram's stain | Positive. | Positive. | Positive. | Positive. |
| Cultural characteristics—bouillon agar plate. | Good growth; irregular margin and convex; dry, opaque, dull; gray with a yellowish cast. | Good growth; irregular margin and flat; dry, opaque, dull; gray with a yellowish cast. | Good growth; irregular margin and flat; dry, opaque, dull; gray with a yellowish cast. | Good growth; irregular margin and flat; dry, opaque, dull; gray with a yellowish cast. |
| Bouillon agar slant | Good growth; beaded or echinulated; yellow-brown. | Good growth; echinulate; gray with a yellowish cast. | Good growth; echinulate; gray with a yellowish cast. | Good growth; beaded or echinulate, gray with a yellowish cast. |
| Bouillon liquid culture. | Thick pellicle formed, transparent, with sediment. | Thick pellicle formed, transparent, with sediment. | Thick pellicle formed, transparent, with sediment. | Thick pellicle formed, transparent, with sediment. |
| Optimum | 28–37° C | 28–37° C | 28–37° C | 28–37° C. | temperature.
Optimum pH......... 6-8................................ 6-8............................ 6-8........................... 6-8.

TABLE 1 (3)

|  | Corynebacterium, sp. No. 803 ATCC 21460 | Corynebacterium, sp. No. 1304 ATCC 21461 |
|---|---|---|
| Shape and size | Rod-shaped, varying in size. Longer cells are club-shaped. 0.9–11.1× 2–3μ. | Rod-shaped, varying in size. Longer cells are club-shaped. 0.9–11.1× 2–3μ. |
| Motility | Non-motile | Non-motile. |
| Sporulation | Asporogenous | Asporogenous. |
| Gram's stain | Positive | Positive. |
| Bouillon agar plate | Good growth; irregular margin, dry, opaque, dul, light yellowish brown. | Good growth; irregular margin; umbilicate, dry, opaque, dull, gray with a hint of yellow. |
| Bouillon agar slant | Good growth; beaded or echinulate, opaque, dull, light yellowish brown. | Good growth; beaded or echinulate, opaque, dull, gray with a hint of yellow. |
| Bouillon liquid culture | Thick pellicle formed; transparent, with slight sediment. | Thick pellicle formed; transparent with slight sediment. |
| Optimum temperature | 28°–32° C | 32° C. |
| Optimum pH | 6–7 | 5–9. |

TABLE 2

|  | Corynebacterium, sp. No. 177 | Corynebacterium, sp. No. 416 | Corynebacterium, sp. No. 803 | Corynebacterium, sp. No. 1304 |
|---|---|---|---|---|
| Oxygen requirement | Aerobic | Aerobic | Aerobic | Aerobic. |
| Litmus milk | Unchanged | Unchanged | Alkalized | Alkalized. |
| Gelatin | Not liquefied | Not liquefied | Not liquefied | Not liquefied. |
| Hydrogen sulfide | Produced | Produced | Produced | Produced. |
| Indole | Not formed | Not formed | Not formed | Not formed. |
| Starch | Not hydrolyzed | Not hydrolyzed | Not hydrolyzed | Not hydrolyzed. |
| Nitrates | Not reduced | Not reduced | Reduced | Reduced. |
| Catalase test | Positive | Positive | Positive | Positive. |
| Urease test | Positive | Negative | Positive | Positive. |
| Sugar metabolism (Leifson method) | Acid produced anaerobically | Acid produced anaerobically | Unchanged | Acid produced anaerobically. |
| Fermentation of sugars | Acid production without visible gas formed. | Acid production without visible gas formed. | Acid production without visible gas formed. | Acid production without visible gas formed. |

Those bacteria are invariably club-shaped rods asporogenous, non-notile, gram-positive, aerobic and irregular in size, and reference to Bergey's Manual of Determinative Bacteriology, 7th edition, suggests that they belong to the family of Corynebacteriacea.

The family of Corynebacteriacea includes the genera Corynebacterium, Lysteria, Erysipelothrix, Microbacterium, Cellulomonas and Arthrobacter. However, bacteria of the genus Lysteria are motile, which bacteria of the genus Erysipelothrix make a feature of elongated filamentous cells and are weakly aerobic. Whereas bacteria of the genus Microbacterium produce lactic acid and acidulate litmus milk, organisms of the genus Cellulomonas are capable of decomposing cellulose.

Thus, any of the above bacteria differs from the bacteria used in this invention.

The foregoing result suggests that the bacteria according to this invention belong either to the genus Arthobacter or to the genus Corynebacterium.

There are differences between the two genera, however. In the first place, while young cells of bacteria of the genus Arthrobacter are gram-negative, their matured cells are gram-positive. In other words they are gram-variants. Secondly, bacteria belonging to the genus Arthrobacter form characteristic spheroidal cells, in contrast to the bacteria according to this invention which are devoid of such a characteristic.

It is thus apparent that the present bacteria belong to the genus Corynebacterium.

Microorganisms, of course, are liable to undergo mutation, whether spontaneously or induced, and the present bacteria are no exception to the rule. It should be understood, however, that such variants and mutants may of course be employed in the method of this invention insofar as they are still capable of utilizing hydrocarbons to produce citric acid.

The culture medium to be employed in the present invention may vary with the strains employed, but such carbon sources as n-paraffins or various crude materials containing n-paraffins, e.g. gas oil and heavy gas oil, can be employed Particularly desirable are such hydrocarbons of nine to 20 carbons in molecule as n-nonane, n-decane, n-undecane, n-dodecane, n-tridecane, n-tetradecane, n-pentadecane, n-hexadecane, n-heptadecane, n-octadecane, n-nonadecane and n-eicosane, as well as their mixtures.

The hydrocarbons are generally used in such an amount as to make the concentration in the culture medium of the normal paraffin(s) with nine to 20 carbon atoms in the molecule, as a whole about 3 to 20 percent (volume/volume) in the culture medium.

As these hydrocarbons are scarcely soluble in water, the addition thereof to an aqueous culture medium is practically carried out under stirring or shaking to prepare a suspension containing very fine particles. If desired, a suspending agent, e.g. a surfactant of the type of polyoxyethylene sorbitan monostearate can be employed.

These hydrocarbons are by themselves sufficient carbon sources, but, if desired, commonly employable carbon sources such as carbohydrate e.g. glucose can be used together with the hydrocarbons.

As nitrogen sources, such inorganic ammonium salts as $NH_4Cl$, $(NH_4)_2SO_4$, $(NH_4)_2HPO_4$, $NH_4OH$, $NH_4NO_3$, etc., urea, ammonium salts or organic acids, e.g. ammonium acetate, and various organic nitrogenous materials such as dried yeast, yeast extract, meat extract, fish meal, soybean flour, corn steep liquor, peptone, distiller's waste, etc. can be employed Those materials may be employed either singly or in combination.

If required, the inorganic salts which are conventionally employed, such as those of iron, manganese, calcium, magnesium, potassium, sodium, etc., as well as various nutrients may also be added to the medium.

The pH of the medium may be selected from the wide range which permits growth of the bacterium used. Generally the range of pH 5 to 8, particularly of pH 6 to 8, is preferred. If, in the course of cultivation, a drop in pH is induced by the production of citric acid, it is advisable to adjust the pH of the medium within the aforesaid range while continuing the cultivation.

For this purpose, the cultivation may be conducted with an occasional addition of a neutralizer which may, for example, be $CaCO_3$, $Ca(OH)_2$, $NH_4OH$, $NaOH$ or $Na_2CO_3$. Alternatively, to give an adequate buffering action to the medium, $CaCO_3$, for one, may be preliminarily added in an amount commensurate with the possible pH drop.

While the incubation temperature may vary somewhat depending upon the particular bacterium used, the temperature is usually maintained within the range of 20° to 40° C.

In carrying out the process of this invention, it is preferable to employ a liquid culture medium, and incubation is carried out aerobically, i.e. with aeration under static or submerged conditions.

In this operation, it is permissable to carry out defoaming as required, using any of such conventional defoaming agents as polyoxypropylene derivatives, soy bean oil, silicone oil, lard oil, etc.

According to this invention, the citric acid accumulated in the medium can be isolated and recovered by any per se conventional means.

Thus, such operations as neutralization, heating, cooling, precipitation, filtration, centrifugation, concentration, decolorization, crystallization and drying, as well as, if required, ion exchange resin treatments, can be carried out either singly or in combination. By such operations, the citric acid can be easily recovered in crystalline form.

The following examples are given to further illustrate this invention, but it is to be understood, however, that the scope of this invention is by no means limited thereto.

Throughout the specification, percentages are calculated on the weight per volume basis, and yields are calculated on weight of produced citric acid per weight of consumed normal paraffins.

The relationship between part(s) by weight and part(s) by volume is the same as hat between gram(s) and milliliter(s).

EXAMPLE 1

A culture of Corynebacterium sp. No. 416 (ATCC 21459) is inoculated to 120 parts by volume of a medium (pH 7.0) which contains a petroleum fraction (4 percent) containing n-paraffin (92 percent) having 10–12 carbon atoms, $KH_2PO_4$ (0.2%), $MgSO_4 \cdot 7H_2O$ (0.05%), $FeSO_4 \cdot 7H_2O$ (0.02%), $NH_4Cl$ (0.4%), yeast extract (0.1%) and $CaCO_3$ (3%) and incubated at 32° C. for 64 hours. The procedure yields 41.4mg. of citric acid per milliliter.

The culture is adjusted to pH 6.8 by the addition of 3N-NaOH. The broth is heated to 95° C. for about 15 minutes, and then cooled to room temperature. The resulting sediment is recovered by filtration. The product is suspended in 50 parts by volume of water, followed by the addition of $5N-H_2SO_4$ to adjust the suspension to pH 2.0. The sediment thus formed is filtered off, and the filtrate is concentrated under reduced pressure until a syrup of low consistency is obtained.

The syrup is allowed to stand in a cold room, whereupon crystals of citric acid separate. The yield is 3.4 parts by weight as citric anhydride.

EXAMPLE 2

A culture of Corynebacterium sp. No. 803 (ATCC 21460) is inoculated 40 parts by volume of a medium (pH 7.0) which contains a petroleum fraction (4%) containing n-paraffin (87%) having 16–20 carbon atoms, $KH_2PO_4$ (0.2%), $MgSO_4 \cdot 7H_2O$ (0.05%), $MnSO_4 \cdot 7H_2O$ (0.002%), $FeSO_4 \cdot 7H_2O$ (0.01%), $NH_4NO_3$ (0.5%), urea (0.1%), dried yeast (0.05) and $CaCo_3$ (3%) and incubated at 28° C. for 3 days. The procedure yields 36mg. of citric acid PER milliliter of the broth. 100 parts by per of the broth is treated in the same manner as in Example 1, whereupon 3.24 parts by weight of citric acid is obtained by crystals.

EXAMPLE 3

A culture of Corynebacterium sp. No. 1304 (ATCC 21461) is inoculated to the same medium as one used in Example 2 and incubated at 32° C. for 2 days, whereupon 32mg. of citric acid is accumulated per milliliter of the broth. One hundred parts by volume of the broth is treated in the same manner as in Example 1.

The procedure yields 2.8 parts by weight of citric acid as crystals.

EXAMPLE 4

A culture of Corynebacterium sp. No. 803 (ATCC 21460) is inoculated to 120 parts by volume of a medium (pH 7.0) which contains n-octadecane (4%), $KH_2PO_4$ (0.2%), $MgSO_4 \cdot 7H_2O$ (0.05%), $MnSO_4 \cdot 7H_2O$ (0.001%), $FeSO_4$ (0.01%), $NH_4NO_3$ (0.5%), urea (0.1%) corn steep liquor (0.05%) and $CaCO_3$ (3%) and incubated at 28° C. for 2 days. The procedure yields 44.2 mg of citric acid per milligram of the resulting broth.

One hundred parts by volume of the broth is treated in the same manner as in Example 1 to obtain 3.66 parts by weight of citric acid as crystals.

EXAMPLE 5

A culture of Corynebacterium sp. No. 177 (ATCC 21458) is inoculated in the same medium as that used in Example 1 and incubated at 34° C. for 3 days. The procedure yields a broth containing 24mg. of citric acid per milliliter. 100 parts by volume of the broth is treated in the same manner as in Example 1 to obtain 1.7 part by weight of citric acid as crystals.

Example 6

Following cultures are inoculated to the same medium as used in Example 2 and incubated at 28° C. for 3 days, and the broth is treated in the same manner as in Example 1.

| Strain | Accession number | citric acid (mg/ml broth) | yield relative to n-paraffin (%) | recovery from 100 ml. broth (g) |
|---|---|---|---|---|
| Corynebacterium sp. No. 981 | ATCC21462 | 33 | 92 | 2.7 |
| Corynebacterium sp. No. 218 | ATCC21463 | 44 | 110 | 3.1 |
| Corynebacterium sp. No. 117 | ATCC21464 | 41 | 102.5 | 2.9 |
| Corynebacterium sp. No. 279 | ATCC21465 | 46 | 115 | 3.35 |
| Corynebacterium sp. No. 384 | ATCC21466 | 43 | 107.5 | 3.05 |
| Corynebacterium sp. No. 628 | ATCC21467 | 38 | 95 | 2.7 |

What is claimed is:

1. A method for producing citric acid which comprises inoculating a citric acid-accumulating and hydrocarbon-assimilating strain of Corynebacterium selected from the group consisting of sp. No. 177 (ATCC 21458), sp. No. 416 (ATCC 21459), sp. No. 803 (ATCC 21460), sp. No. 1304 (ATCC 21461), sp. No. 981 (ATCC 21462), sp. No. 218 (ATCC 21463), sp. No. 117 (ATCC 21464), sp. No. 279 (ATCC 21465), sp. No. 384 (ATCC 21466), sp. No. 628 (ATCC 21467) in an aqueous culture medium containing, as the main carbon source, at least one normal paraffin containing nine to 20 carbon atoms in the molecule; incubating the culture at a pH of from about 5 to about 8 until citric acid is substantially accumulated in the culture broth; and isolating the so-accumulated citric acid therefrom.

2. A method according to claim 1, wherein the bacterium is Corynebacterium sp. No. 177, ATCC 21458.

3. A method according to claim 1, wherein the bacterium is Corynebacterium sp. No. 416, ATCC 21459.

4. A method according to claim 1, wherein the bacterium is Corynebacterium sp. No. 803, ATCC 21460.

5. A method according to claim 1, wherein the bacterium is Corynebacterium sp. No. 1304, ATCC 21461.

6. A method according to claim 1, wherein the bacterium is Corynebacterium sp/ No. 981, ATCC 21462.

7. A method according to claim 1, wherein the bacterium is Corynebacterium sp. No. 218, ATCC 21463.

8. A method according to claim 1, wherein the bacterium is Corynebacterium sp. No. 117, ATCC 21464.

9. A method according to claim 1, wherein the bacterium is Corynebacterium sp. No. 279, ATCC 21465.

10. A method according to claim 1, wherein the bacterium is Corynebacterium sp. No. 384, ATCC 21466.

11. A method according to claim 1, wherein the bacterium is Corynebacterium sp. No. 628, ATCC 21467.

* * * * *